United States Patent
McCann et al.

(10) Patent No.: US 9,495,210 B1
(45) Date of Patent: Nov. 15, 2016

(54) LOGICAL DEVICE MODEL

(75) Inventors: Peter J. McCann, Mason, NH (US); Christopher M. Gould, Leominster, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1912 days.

(21) Appl. No.: 12/215,917

(22) Filed: Jun. 30, 2008

(51) Int. Cl.
G06F 17/30 (2006.01)
G06F 9/50 (2006.01)
G06F 9/52 (2006.01)

(52) U.S. Cl.
CPC .. *G06F 9/50* (2013.01); *G06F 9/52* (2013.01)

(58) Field of Classification Search
CPC ....... G06F 17/30893; G06F 9/50; G06F 9/52
USPC ................... 707/737, 781; 709/226
See application file for complete search history.

(56) References Cited

U.S. PATENT DOCUMENTS

| | | | |
|---|---|---|---|
| 5,428,730 A * | 6/1995 | Baker et al. | 715/740 |
| 6,799,208 B1 * | 9/2004 | Sankaranarayan et al. | 709/223 |
| 6,871,350 B2 * | 3/2005 | Wong et al. | 719/323 |
| 7,003,586 B1 * | 2/2006 | Bailey et al. | 709/250 |
| 7,069,354 B2 * | 6/2006 | Pooni et al. | 710/38 |
| 7,181,553 B2 * | 2/2007 | Pooni et al. | 710/38 |
| 7,373,504 B1 * | 5/2008 | Belgaied et al. | 713/164 |
| 7,437,451 B2 * | 10/2008 | Tang et al. | 709/224 |
| 7,644,413 B2 * | 1/2010 | Wong et al. | 719/323 |
| 7,653,722 B1 * | 1/2010 | Krishna et al. | 709/224 |
| 7,726,568 B2 * | 6/2010 | Singh et al. | 235/451 |
| 7,844,972 B2 * | 11/2010 | Raja et al. | 718/104 |
| 2003/0014521 A1 * | 1/2003 | Elson et al. | 709/225 |
| 2005/0033846 A1 * | 2/2005 | Sankaranarayan et al. | 709/226 |
| 2005/0044205 A1 * | 2/2005 | Sankaranarayan et al. | 709/223 |
| 2005/0268115 A1 * | 12/2005 | Barde et al. | 713/189 |
| 2006/0253859 A1 * | 11/2006 | Dai et al. | 719/321 |
| 2007/0083868 A1 * | 4/2007 | Sankaranarayan et al. | 718/104 |
| 2007/0266392 A1 * | 11/2007 | Thoelke | 719/313 |
| 2009/0001160 A1 * | 1/2009 | Davis et al. | 235/380 |
| 2009/0014519 A1 * | 1/2009 | Singh et al. | 235/437 |

OTHER PUBLICATIONS

U.S. Appl. No. 12/079,759, filed Mar. 28, 2008, McCann, et al.
U.S. Appl. No. 12/079,822, filed Mar. 28, 2008, McCann, et al.

* cited by examiner

*Primary Examiner* — Vincent Boccio
(74) *Attorney, Agent, or Firm* — Muirhead and Saturnelli, LLC

(57) ABSTRACT

Described are techniques for providing a logical device model. In one embodiment, a a method for providing a logical device model includes providing a plurality of logical devices, at least one of said plurality of logical devices being provided by a first provider executing in kernel space and at least one of said plurality of logical devices being provided by a second provider executing in user space, and establishing a relationship between the first provider and the second provider wherein the first provider is a consumer of a logical device provided by the second provider, said logical device model including said relationship.

17 Claims, 12 Drawing Sheets

LOGICAL DEVICE MODEL

BACKGROUND

1. Technical Field

This application generally relates to logical devices, and more particularly to techniques used with logical device models.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Code modules that execute on a data storage system, as well as other systems, may provide services that may be used by other code modules. Code modules that provide a service or provide access to a resource may be referred to as providers. Other code modules that use the service or resource exposed through a provider may be referred to as consumers. The provider may provide a service or provide access to a resource in the form of a logical device which can be accessed by a consumer. It may be desirable to utilize a technique which facilitates a logical device model so that consumers and providers may execute in a variety of different environments.

SUMMARY OF THE INVENTION

In accordance with one aspect of the invention is a method for providing a logical device model comprising: providing a plurality of logical devices, at least one of said plurality of logical devices being provided by a first provider executing in kernel space and at least one of said plurality of logical devices being provided by a second provider executing in user space; and establishing a relationship between the first provider and the second provider wherein the first provider is a consumer of a logical device provided by the second provider, said logical device model including said relationship. The first provider and the second provider may use a same provider application programming interface in connection with logical devices provided by said first and said second providers for consumption by a consumer. The same provider application programming interface may include a first routine to create a logical device and make the logical device available for consumption, and a second routine to destroy the logical device so that the logical device is not available for consumption. Each of said plurality of logical devices may be associated with at least one of a service or a physical resource. A first logical device of said plurality of logical devices may be a consumer of a plurality of others of said plurality of logical devices. The provider of the first logical device may execute in user mode and said plurality of others of said logical devices may be provided by a corresponding provider executing in kernel mode. A plurality of relationships may be established between a plurality of consumers of said logical devices and a plurality of providers providing said logical devices, wherein each of said plurality of providers executing in user mode has a unique logical device name space, and wherein a single logical device name space is associated with all logical devices provided by all code modules executing in kernel mode. Each of said plurality of providers may be notified upon abnormal termination of a consumer executing in user mode that consumes a logical device provided by said each provider. Each of said plurality of consumers may be notified upon abnormal termination of a provider executing in user mode that provides a logical device which said each consumer consumes. The relationship may represent a runtime relationship between said first provider and said second provider.

In accordance with another aspect of the invention is a method for providing a logical device model comprising: providing a plurality of logical devices provided by a plurality of providers, wherein at least a first portion of said plurality of logical devices are provided by a provider that is included in said plurality of providers and executes in kernel mode and at least a second portion of said plurality of logical devices are provided by one or more others of said plurality of providers, each of said one or more others of said providers executing in user mode; requesting, by a consumer, to establish a relationship with a first of said plurality of providers, said requesting including said consumer opening a first of said plurality of logical devices provided by said first provider; establishing, in response to said opening, a logical communication path between said consumer and said first provider in accordance with whether each of said consumer and said first provider execute in user space or kernel space, and whether said consumer and said first provider execute in a context of a same address space; and requesting, by said consumer, to consume said first logical device, said requesting including said consumer sending a request to said first provider using said logical communication path. Each of the one or more others of said plurality of providers that executes in user mode and said provider that executes in kernel mode may use a same provider application programming interface to create logical devices provided. The consumer may be a first consumer executing in user mode and uses a consumer application programming interface to perform said opening and said sending said request, and wherein a second consumer executing in kernel mode may use said consumer application programming interface to establish a relationship between said second consumer and said first provider, wherein said first consumer and said second consumer are both consumers of said first logical device of said first provider. The consumer may be one of said plurality of providers. The consumer may execute in kernel mode and said first provider may execute in user mode. The method may also include requesting, by said consumer using a consumer application programming interface, to close said first logical device, said consumer application programming interface being used by consumers executing in user space and consumers executing in kernel space, said consumer application programming interface including an interface used in connection with said consumer opening said first logical device, and an interface used in connection with said consumer sending said request.

In accordance with another aspect of the invention is a computer readable medium comprising executable code stored thereon for providing a logical device model, the computer readable medium comprising executable code for: providing a plurality of logical devices, at least one of said plurality of logical devices being provided by a first provider executing in kernel space and at least one of said plurality of logical devices being provided by a second provider executing in user space; and establishing a relationship between the first provider and the second provider wherein the first provider is a consumer of a logical device provided by the second provider, said logical device model including said relationship. The first provider and said second provider may use a same provider application programming interface in connection with logical devices provided by said first and said second providers for consumption by a consumer, and wherein the same provider application programming interface may include a first routine to create a logical device and make the logical device available for consumption, and a second routine to destroy the logical device so that the logical device is not available for consumption. Each of said plurality of logical devices may be associated with at least one of a service or a physical resource. A first logical device of said plurality of logical device may be a consumer of a plurality of others of said plurality of logical devices. The provider of the first logical device may execute in user mode and said plurality of others of said logical devices may be provided by a corresponding provider executing in kernel mode. A plurality of relationships may be established between a plurality of consumers of said logical devices and a plurality of providers providing said logical devices. Each of said plurality of providers executing in user mode may have a unique logical device name space, and wherein a single logical device name space may be associated with all logical devices provided by all code modules executing in kernel mode. Each of said plurality of providers may be notified upon abnormal termination of a consumer executing in user mode that consumes a logical device provided by said each provider. Each of said plurality of consumers may be notified upon abnormal termination of a provider executing in user mode that provides a logical device which said each consumer consumes.

BRIEF DESCRIPTION OF THE DRAWINGS

Features and advantages of the present invention will become more apparent from the following detailed description of exemplary embodiments thereof taken in conjunction with the accompanying drawings in which.

Figure 1:
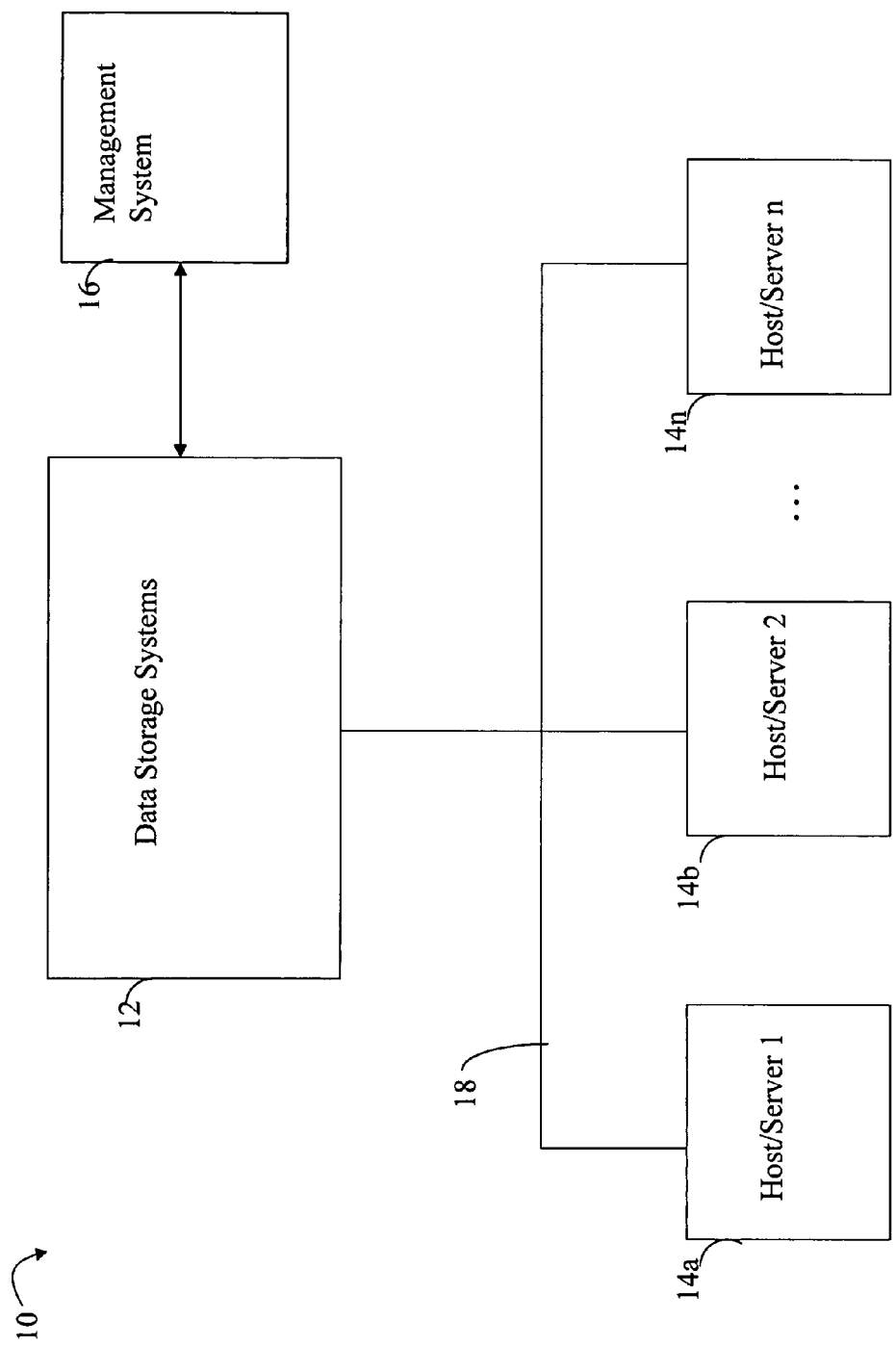
FIG. 1 is an example of an embodiment of a computer system that may utilize the techniques described herein.

DETAILED DESCRIPTION OF
EMBODIMENT(S)

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time.

A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems which are data storage arrays offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
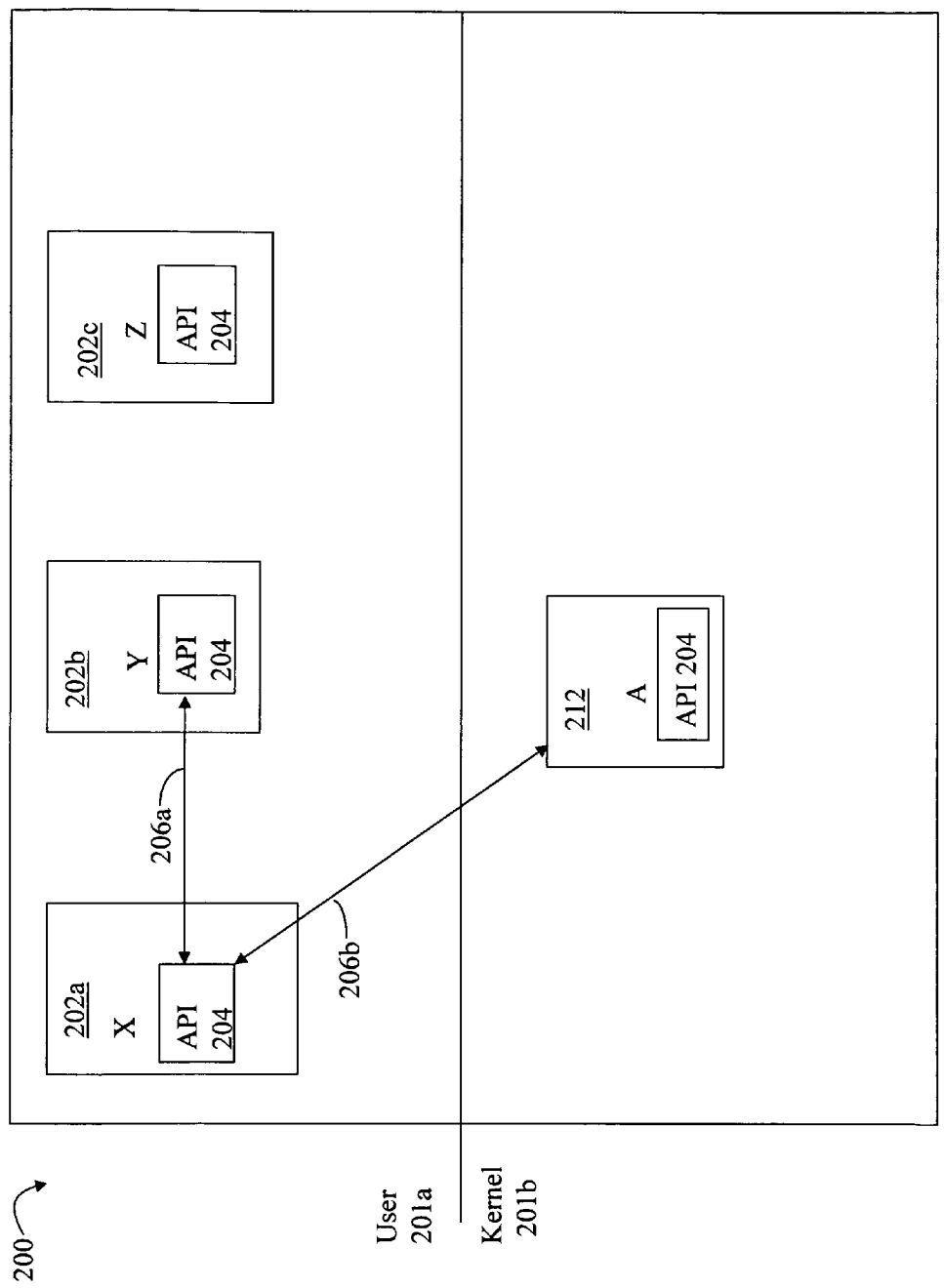
FIG. 2 is an example illustrating use of an API (application programming interface) in connection with a same code module that may be executed in user space and kernel space in an embodiment.

Referring to FIG. 2, shown is an example of components that may be executing on a processor node of a data storage system. If a data storage system has multiple processors, FIG. 2 may illustrate components that may be executed by each such processor and includes user mode processes 202a, 202b and 202c and module 212 executing in kernel mode.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, and 202c may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a code module using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

As will be described in following paragraphs, the API may be used to facilitate a logical device model. Code modules that execute on a data storage system, as well as other systems, may provide services that may be used by other code modules. Code modules that provide a service or provide access to a resource may be referred to as providers. Other code modules that use the service or resource exposed through a provider may be referred to as consumers. The provider may provide a service or provide access to a resource in the form of a logical device which can be accessed by a consumer. In other words, a provider may create a logical device associated with a service or resource. A consumer may then issue requests to use the service or resource by opening the logical device and issuing requests to the provider by specifying the particular logical device associated with the service or resource. In connection with techniques described herein, a provider of a logical device may be a code module that executes in user space or kernel space. Similarly, a consumer of a logical device may be a code module that executes in user space or kernel space. Each provider and consumer may use a common API to facilitate a logical device model so that consumers and providers may execute in a variety of different environments as described herein. Each consumer can use logical devices of providers which are in kernel space or user space. Each provider can also use logical devices of other providers which are in kernel space or user space. Thus, providers using the services or resources of other providers allows for creation of a logical device model in which the logical devices are in user space or kernel space and in which all providers use a same API and all consumers use a same API. A more detailed example is described in following paragraphs and figures.

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leave the implementation details of the API calls to be included in the API code. A provider may use a same API in both user mode and kernel mode in which the provider creates and makes available a logical device for use by other code modules. A consumer of a logical device may use a same API in both user mode and kernel mode to access and use a logical device of a provider in which the provider is in user mode or kernel mode.

With reference to FIG. 2, U (user) space module 202a may be a provider of logical device X, U space module 202b may be a provider of logical device Y, U space module 202c may be a provider of logical device Z, and K (kernel) space module 212 may be provider of logical device. In accordance with techniques described herein, each of the foregoing providers may create and make available for use the logical devices using a same provider API. Each of the foregoing providers, as well as other code modules that may not be a logical device provider, may also be consumers and may attach and use one or more of the foregoing logical devices using a same consumer API. Both the provider and consumer APIs are described in more detail below.

In connection with descriptions herein, reference may be made to attaching and opening a logical device. It should be noted that such terms may be used interchangeably with one another herein and refer to the same operation.

As will be described in more detail in following paragraphs, a provider of a logical device may be identified by the container providing the logical device. Therefore, since each container (each U-space container and the single K-space container) may have its own logical device name space, a particular instance of a logical device may be referenced by the combination of container providing the logical device and the logical device name. In the embodiment described herein, there may be a single K-space container characterized as the single provider or single container providing all K-space logical devices as provided by all K-space code modules issuing create device API provider calls as described in more detail below.

Figure 2A:
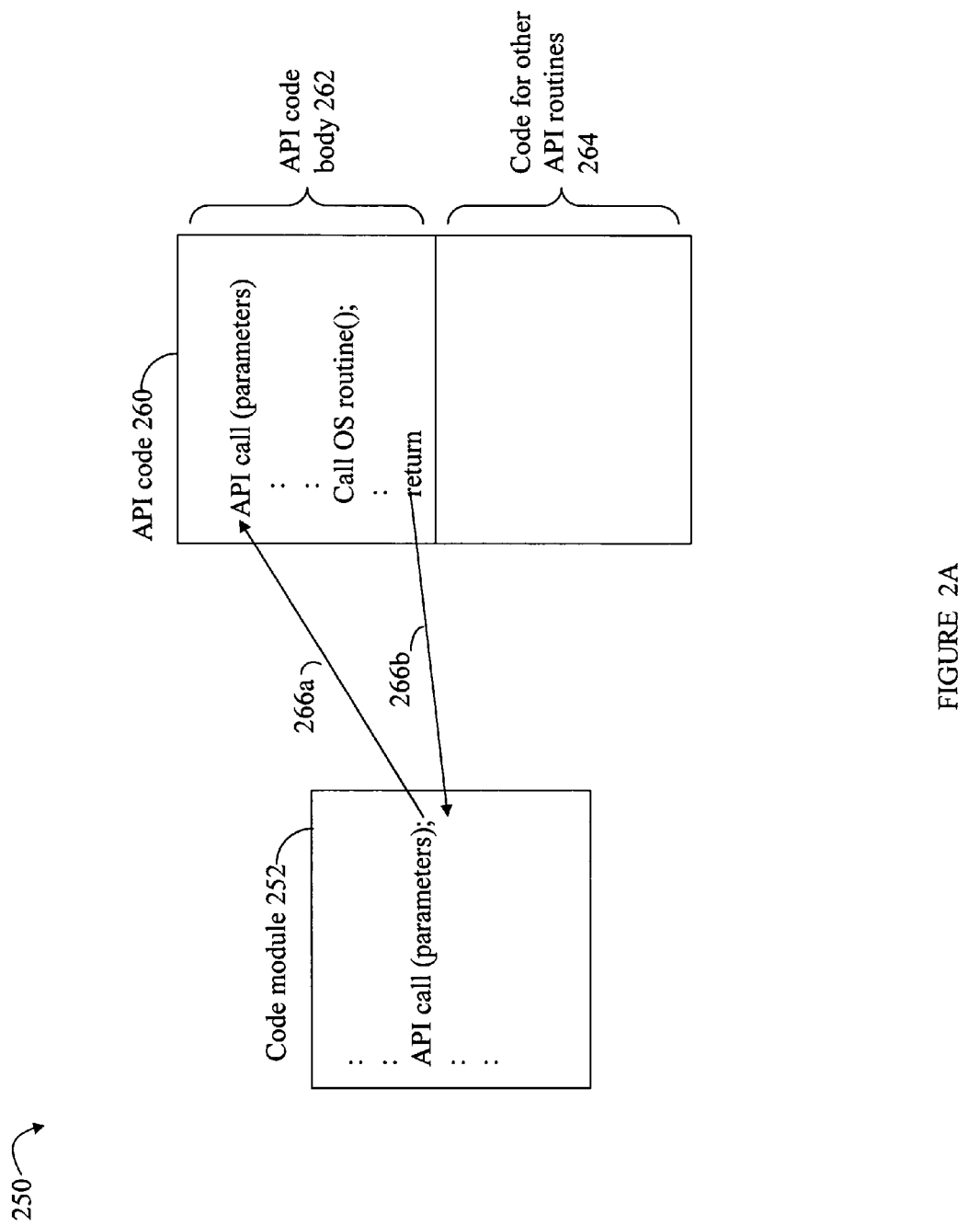
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

The intermodule communication techniques described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein, may be used in connection with inter module communication as needed to implement the techniques herein for a logical device model regarding consumers and providers executing in user space and/or kernel space. As described above, an API may be defined which provides interfaces for use by consumers and providers of logical devices in accordance with an embodiment of a logical device model. As described in the foregoing two patent applications, the API may also include interfaces defined and used to facilitate inter-module communication between two code modules executing in user mode (U-U communication), or between a first code module that executes in user mode and a second code module that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are user mode processes, U-K communications may be utilized when the client executes in user mode and the server executes in kernel mode, and K-U communications may be utilized when the client executes in kernel mode and the server executes in user mode. In connection with the techniques herein, the consumer may be a client which issues requests to the provider as a server and the appropriate intermodule communications may be used depending on the particular mode (e.g., user U or kernel K) of each of the consumer and provider. It should be noted that in connection with communications when both client, (such as a consumer) and server (such as a provider) execute in a same container or address space as with K-K communications or when both are included in the same U-space container, communications between such code modules may utilize local procedure calls available for communication within the same container or address space.

In accordance with the techniques described herein, a same code module may be executed using a communications model, logical device model and facility embodied in the API in both user space and kernel space meaning that the same set of operations are available in user space and kernel space. The logical device model as used by providers and consumers may be performed by making calls into the API using a defined interface providing code portability across user and kernel mode in all supported environments. Furthermore, code of the API may utilize and include the intermodule communications as described in the foregoing '759 and '822 patent applications.

In connection with the name spaces associated with logical devices, an embodiment may associate a unique namespace with each container. Thus, for example, a different name space may be associated with each U space code module that may be characterized as a separate container described above. Similarly, a single name space may be associated with all K-space code modules. Generally, each U-space container may include one or more code modules, and one or more threads included in the one or more code modules of the U-space container. Similarly, the single K-space container refers to all code modules executing in kernel space, and the one or more threads included in the one or more code modules in kernel space. For purposes of illustration only with reference back to FIG. 2, each of the code modules 202a 202b and 202c is a separate U-space container. Thus, each of 202a, 202b, and 202c may represent a separate U-space container having a single code module and each have their own name space. Similarly, module 212 (as well as another other K-space modules providing logical devices) all have a same logical device name space associated with the single K-space container. Each of foregoing U-space and K-space containers may have a logical device by the same name since each container has its own name space.

As described herein, a logical device may be associated with a service and/or physical resource. More generally, a logical device may be characterized as a logical entity that has associated state information and/or logic to perform processing. A logical device provided by a provider may provide a service such as to perform compression, encryption, decryption, implement a mathematical function or perform a computation of numbers, or some other logical task or operation. A logical device may also be associated with a resource, such as a physical storage device, or portion thereof, and the provider of the logical device may be providing access to the foregoing resource. A logical device may also be a consumer of one or more other logical devices. Thus, a logical device may be included in a logical device runtime stack model in which a first logical device consumes or uses another logical device. In connection with the techniques herein with reference back to FIG. 2, for example, an instance of a logical device stack may be created as X-Y and X-A where logical device X may consume logical device Y as illustrated by 206a, and logical device X may also consume logical device A as illustrated by 206b. As used herein, if logical device 1 consumes logical device 2, it means that the code of the service provider of logical device 1 acts as a consumer by using services or resources of logical device 2. In other words, the code of the service provider of logical device 1 uses a consumer API to make calls to another service provider of logical device 2. As a more complex example in connection with the techniques herein with reference back to FIG. 2, an instance of a logical device stack may be created at runtime as X Y A Z where logical device X may consume logical device Y, logical device Y may consume logical device A, and logical device A may consume logical device Z.

As will be appreciated by those skilled in the art, the techniques herein may be used to facilitate creation of a logical device model that may reflect a runtime logical device stack which consists of any number of consumers and providers, and each such consumer and provider may be in user or kernel space. Each such logical device may consume one or more other logical devices in which each such logical device that is further consumed is in user space or kernel space. More generally, consumer-provider relationships between logical devices may form any one of a variety of different structures expressing the runtime consumer-provider relationships such as, for example, a linear structure or a even a tree structure in accordance with the set of relationships between different logical devices. In accordance with the use of a common provider API and a common consumer API, a symmetric logical device model may be achieved in which the consumers and providers and associated logical devices may be in user mode or kernel mode in any combination.

Figure 3:
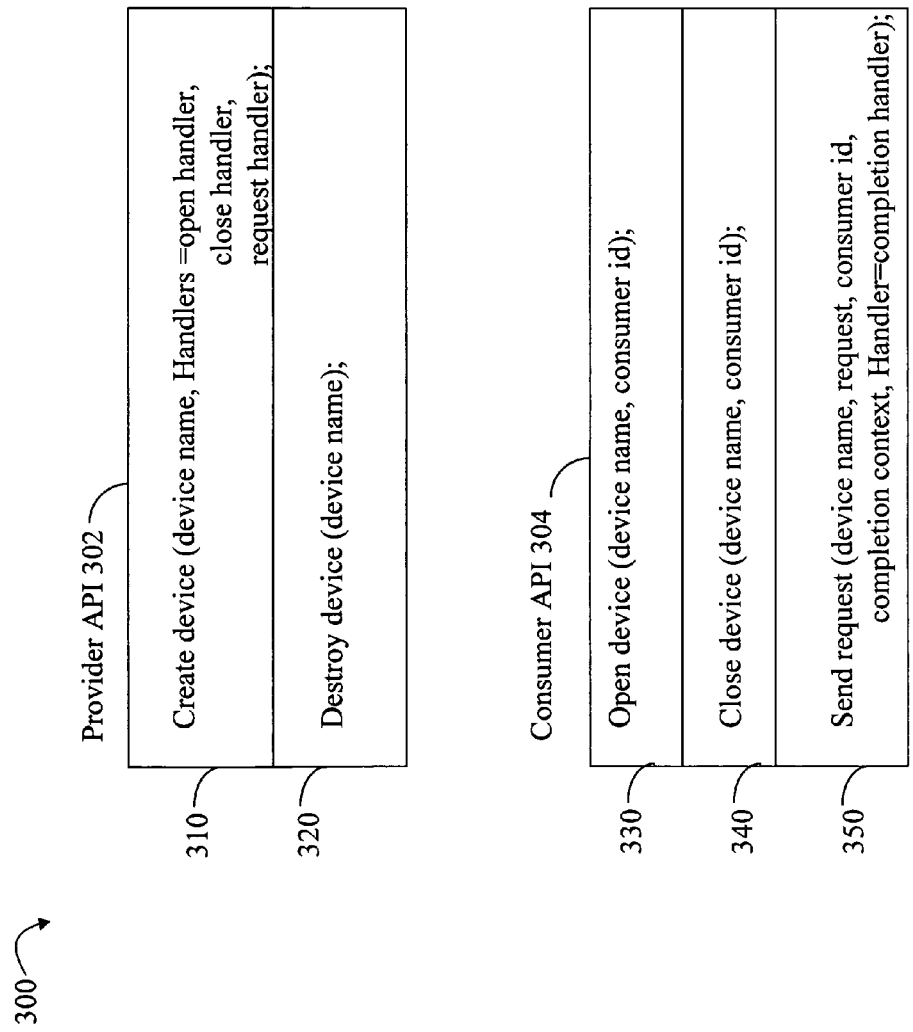
FIG. 3 is an example illustrating a consumer and provider API for use in connection with the techniques herein in an embodiment.

Referring to FIG. 3, shown is an example of a provider API 302 and a consumer API 304 that may be used in an embodiment in connection with the techniques herein. The provider API 302 may be used to create a logical device and export services associated with the logical device so that other code modules as a consumer can attach or open and use the service through references to the logical device. The provider API includes a first routine described by element 310 that may be invoked by the provider as follows:

Create device (device name, Handlers=open handler,
close handler,
request handler);

The create device API may be used by a provider to create a logical device and make that logical device name available for use or consumption by other code modules.

The first parameter, device name, specifies the logical device name as may be referred to by other code modules or consumers when requesting services or resources associated with, or provided in connection with, the logical device "device name". Although noted as a device name, the first parameter may be more generally characterized as an identifier identifying the logical device being created and associated with a particular provider.

Each of the handlers specified as a parameter in 310 may refer to code or callback routines included in a code module of the provider. Each of the different handlers may be invoked upon the occurrence of a different event or, rather, in response to a different consumer invocation action, described below. Callbacks as used herein may be characterized as supplied routines which are invoked at particular points in time by other code, such as code of the API. The callbacks may provide the provider or other code module including the callback with an opportunity to perform optional processing in connection with the techniques herein.

Element 320 includes the following second routine used by a provider:

Destroy device (device name);

which can be invoked by a provider to remove the logical device "device name" from a list of logical devices available for consumption by other code modules. Successful completion of the destroy device API by a provider results in removing the identified device name from the list of logical devices available for consumption which are associated with the provider performing the destroy device API call.

Consumer API 304 may include three routines as represented by elements 330, 340 and 350. Element 330 specifies a first routine used by the consumer:

Open device (device name, consumer id);

which is called by a consumer to open a connection to the logical device identified by the first parameter "device name". The consumer may specify a value for "device name" on invocation. The second parameter, "consumer id" may be a unique identifier associated with the consumer for purposes of tracking subsequent calls made using the consumer API by this particular consumer. The consumer id may be a parameter that is determined by the open handler callback and may be subsequently used by other code modules as described elsewhere herein. An embodiment may also generate the consumer id in other ways. For example, rather than have the open handler callback generate an initial value for the consumer id, the API may generate a unique consumer id for each different consumer using the consumer API calls described herein. For example, code of the open device API may generate a consumer id for each consumer. Code of the other consumer APIs (e.g., close device and send request) may also further utilize and forward the consumer id as a parameter. The consumer id may then be used by the handlers as described herein using the API-generated consumer id rather than a consumer id generated by the open handler.

In connection with consumer APIs 330, 340 and 350, it should be noted that the logical device may be more generally characterized as logical device handler or identifier denoted by the logical device the consumer wishes to utilize. In one embodiment as described herein, each container may have its own logical device namespace so that the device name parameter may include a container identifier identifying the particular provider of the logical device for proper logical device resolution.

Successful completion of the open device consumer API call 330 establishes a communication path or channel between the consumer performing the open device API call 330 and the provider of the logical device indicated by the first parameter, device name. The API code may use the appropriate communication technique for subsequent consumer-provider communications over the established path in accordance with whether the consumer and provider are executing in the context of the same or different containers, and, whether the consumer and provider are executing in user space or kernel space. If the consumer and provider are executing as different containers, the appropriate U-U, K-U, or U-K intermodule communication technique can be used as described in the '759 and '822 patent applications. If both consumer and provider are executing in the context of a same container or address space (e.g., both in kernel space or the same user space container), then local procedure call mechanisms may be used to facilitate communications therebetween.

Element 340 specifies a second routine used by the consumer:

Close device (device name, consumer id);

which is invoked by the consumer to signify an end of use of services associated with the logical device indicated by the parameter "device name" by the consumer identified by the second parameter "consumer id". The device name parameter may be a same value or handle used in a previously successful open device consumer API call which established a communication path between the consumer and the provider of the indicated logical device. The consumer id parameter may not be a consumer-supplied value but may rather have a value determined by the open handler callback and, the value may be subsequently used by other code modules described herein.

Element 350 specifies a third routine used by the consumer:

Send request (device name, request, consumer id, completion context, Handler=completion handler);

The consumer may supply values of all the parameters except the consumer id. In connection with the send request API, the consumer associated with "consumer id" (parameter 3) is sending a request (parameter 2) to the logical device "device name" (parameter 1). The device name parameter may be a same value or handle used in a previously successful open device consumer API call which established a communication path between the consumer and the provider of the indicated logical device. Parameter 4, the completion handler or callback, may be an optional parameter. If the completion handler is specified, the request may be performed asynchronously without the consumer waiting inline. When the provider has completed processing the request, the completion handler may then be invoked as completion handler (completion context) where the completion context (parameter 5) is a consumer supplied value that may be used by the consumer completion handler to identify a particular send request invocation instance (e.g., provide context for the particular send request invocation to the completion handler). If the completion handler is not specified, the request is processed synchronously so that the consumer code waits at the point of the send request API call until control is returned from the send request API call when the request processing has been completed. The request may be an address of a portion of memory at which a request command block is stored as will be described in more detail elsewhere herein. The send request API 350 may be invoked by a consumer to request performance of services of the identified logical device. The request may include input data used by the provider in providing the service. The request may also include return data such as results related to the processing or service performed by the provider as associated with the logical device. In one embodiment using the intermodule communication techniques described in the '759 and '822 patent applications for U-U, U-K, or K-U communications, the send request API code may send a request in accordance with a normal or backup communication mode. Selection of one of the foregoing modes for each request is described in more detail in the '759 and '822 patent applications.

With reference to the handlers of 310 in the provider API for the create device routine, the open handler may specify a routine of the provider of the logical device "device name" (parameter 1) which is called in response to a consumer invocation of the open device API 330. The close handler may specify a routine of the provider of the logical device "device name" (parameter 1) which is called in response to a consumer invocation of the close device API 340. The request handler may specify a routine of the provider of the logical device "device name" (parameter 1) which is called in response to a consumer invocation of the send request API 350.

In one embodiment, the consumer id provided on each of the consumer API calls of 304 may be passed as a parameter to each of the foregoing open, close, and request handlers of 310. The consumer id may be used by the foregoing handlers in connection with tracking and managing outstanding requests for a consumer associated with the consumer id. Such information may be used to perform processing upon abnormal termination by the consumer. For example, the provider may perform processing to perform any needed cleanup in connection with the outstanding requests for the consumer, such as deallocate resources, and the like.

The open handler callback may be invoked as open handler (device name, &consumer id) when a consumer opens a logical device "device name" for use with the techniques herein. The consumer id may be a provider-supplied value for use by subsequent provider callbacks. The consumer id may uniquely identify the consumer that issued the corresponding open device call. The consumer id may be filled in, for example, by the open handler callback and used by the request handler and close handler to identify information associated with requests for the particular consumer. As will be appreciated by those skilled in the art, there may be multiple requests in progress at a point in time even for a single consumer such as when using the asynchronous send request API. The consumer id may be used to identify outstanding requests associated with a particular consumer and to determine what requests have not completed in the event of a consumer failure so that the provider code may perform clean up processing as described elsewhere herein.

The provider API 302 and consumer API 304 will now be described in more detail. The create device routine 310 of the provider API may register the specified logical device name for the particular provider. In one embodiment, code of the API may keep a list of provider code modules and associated logical devices so that, in response to one of the consumer API calls of 304, the appropriate provider may be contacted. When a provider calls the create device API, the handlers specified may be registered and are invoked in response to the corresponding consumer API call as described above. Thus, a provider calling API 310 effectively registers a logical device of the provider as available for consumption by other code modules and specifies which routines of the provider of the logical device are invoked in response to different consumer API calls.

In one embodiment, code of the API may keep track of which code modules are providers of which logical devices. The API code in the user space may, for example, keep track of those logical devices defined for use on the user side. The API code in the kernel space may similarly keep track of those logical devices defined for use on the kernel side. When a call is made by a consumer using the consumer API, code of the API may facilitate identification and communication with the appropriate provider code module. To further illustrate with reference to FIG. 2, API code in user space may note that module 202a is provider of logical device X, module 202b is provider of logical device Y and module 202c is provider of logical device Z. API code in kernel space may note that module 212 is provider of logical device A.

Figure 4:
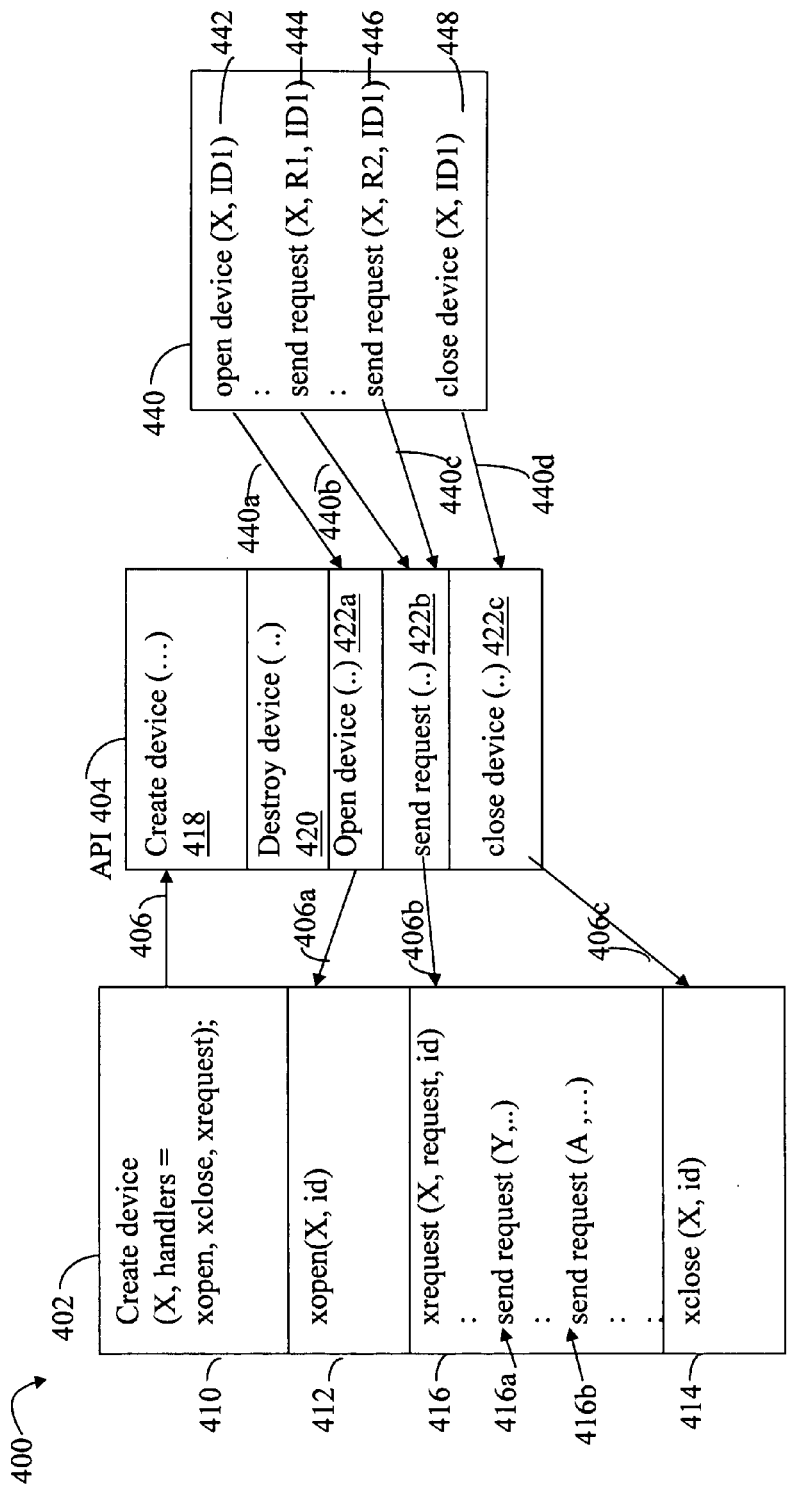
FIGS. 4 and 4A are examples illustrating use of the API of FIG. 3 in an embodiment.

Referring to FIG. 4, shown is an example illustrating a provider code module and API in more detail as may be used in an embodiment with the techniques herein. The example 400 includes a provider code module 402, API code 404, and another consumer code module 440. Code module 440 may be characterized as just a consumer of logical devices. Code module 402 may be characterized as both a provider of a logical device (X) and also a consumer of logical devices (Y and A). It should be noted for purposes of illustration of this example, the send request consumer API calls are synchronous and the illustrated code modules in 400 may execute in user space. Also, for purposes of simplicity of illustration, provider module 402 is considered the provider of the logical device X although no provider identifier is explicitly included in the consumer API. For purposes of illustration in this example, code modules 440 and 404 may execute in the context of a first U-space container and module 402 may execute in the context of a second different U-space container with its own instance of API 404. Thus the first U-space container may be characterized as a provider of logical device X and also a consumer of logical devices Y and A. The second U-space container, and code module therein, may be characterized as a consumer of logical device X. It should be noted that although a single instance of API 404 is shown for purposes of illustration, each of the foregoing U-space containers executes with its own instance of API 404.

The module 402 may be provider code module 202a from FIG. 2 which is a provider of logical device X. As described above, in connection with providing services in connection with logical device X, logical devices Y and A are consumed. Module 402 includes a first code portion 410 which executes a create device API call as illustrated by 406, code portion 412 for the open handler xopen, code portion 414 for the close handler xclose, and code portion 416 for the request handler xrequest. Code portion 416 may include calls 416a and 416b. Call 416a sends a request to logical device Y and call 416b sends a request to logical device A.

API code 404 may include code portions for each of the provider and consumer APIs of FIG. 3. Specifically, code portions 418 and 420 correspond to the provider API and code portions 422a-422c correspond to the consumer API. At a first point in time, code portion 410 may execute so that the create device API 418 is invoked 406 which registers logical device X as available for use or consumption by other code modules using the consumer API. Code of 418 in this invocation at the first point in time may also register the specified handlers xopen, xclose and xrequest which are to be called, respectively, in response to consumer API calls to open device, close device, and send request for logical device X. At some later second point in time, another code module 440 may subsequently make call 442 to open device X resulting in a transfer of control 440a to code for the open device API 442a, a transfer of control 406a to handler 412, and then control returns from each of the foregoing to module 440 following the open device API call invocation at 442. Execution of code at 444 and 446 each result in a transfer of control to the send request API code 422b, a callback to handler 416, and then control returns from each of the foregoing to module 440 following the appropriate send request API invocation. Execution of code at 448 results in a call to the close device API code 422c, a callback to handler 414, and then control returns from each of the foregoing to module 440 following the invocation at 448. After the foregoing callbacks or handler code portions 412, 414 and 416 have completed, control may be returned to appropriate points in the API code 404, and then to the appropriate points within module 440 to resume execution. For example, after call 442, control transfers to the API code portion 422a which invokes handler 412. After handler 412 has completed, control returns to API code portion 422a where the handler 412 was invoked. After code of 422a completes, control then returns to module 440 to resume execution following the invocation point at 442.

It should be noted that when a consumer API call for a logical device is made from user space code, the API code may first determine whether the logical device is located in user space by the API code determining whether the logical device is registered in connection with a user space provider. If so, the API code may use intermodule communications as appropriate to facilitate communication with the appropriate user space provider code module. If the logical device is not registered in connection with a user space provider, the API code may perform processing to determine whether the logical device is associated with a kernel space provider. This may be performed in a variety of different ways. In one embodiment, the user space API code may similarly keep a running list of current kernel providers and kernel logical devices and appropriately facilitate communications with the appropriate kernel code module. When a new kernel logical device is created, the user space API code may be notified and may accordingly update its list of existing kernel logical devices. The foregoing logical processing may be performed in connection with each consumer API call. Code of the API may then use the appropriate intermodule communication mechanism and techniques as described in the '759 and '822 applications in communicating with the requested provider. In one embodiment, each container may track and maintain its own list of logical devices rather than have code of the API perform such processing as described above. When an API call is made as described herein, an input parameter may specify the container and logical device name. Code of the API may communicate with the appropriate container as identified by the input parameter. If the container does not provide services for the logical device, the container may return to the API code with an error indicating this status.

For a given logical device, code of 422a, 422b and 422c may perform processing to determine the appropriate provider code module and utilize the appropriate intermodule communication technique as described in the '759 and '822 applications. For example, in connection with a consumer communicating with a provider for 442, 444, 446, 448, and 416a, the U-U intermodule communication technique may be utilized as needed since both the consumer (module 440) and provider (module 402) execute in user space. The open device call 442 results in the API code 442a establishing a U-U communication path or channel which is then used in connection with subsequent communications as needed for calls 444, 446 and 448. In connection with 416b, the U-K intermodule communication technique may be utilized since the consumer (module 402) executes in user space and the provider (of logical device A) executes in kernel space. It should be noted that, although not illustrated in the example 400, the code module 402 may include other consumer API calls, such as open device API calls, for use with the logical devices Y and A in order to establish communication paths with providers. Although not specifically illustrated in this example, the K-U intermodule communication technique may be similarly utilized in connection with a kernel code module which consumes a user mode logical device (e.g., the consumer executes in kernel space and the provider of the logical device executes in user space).

Figure 4A:
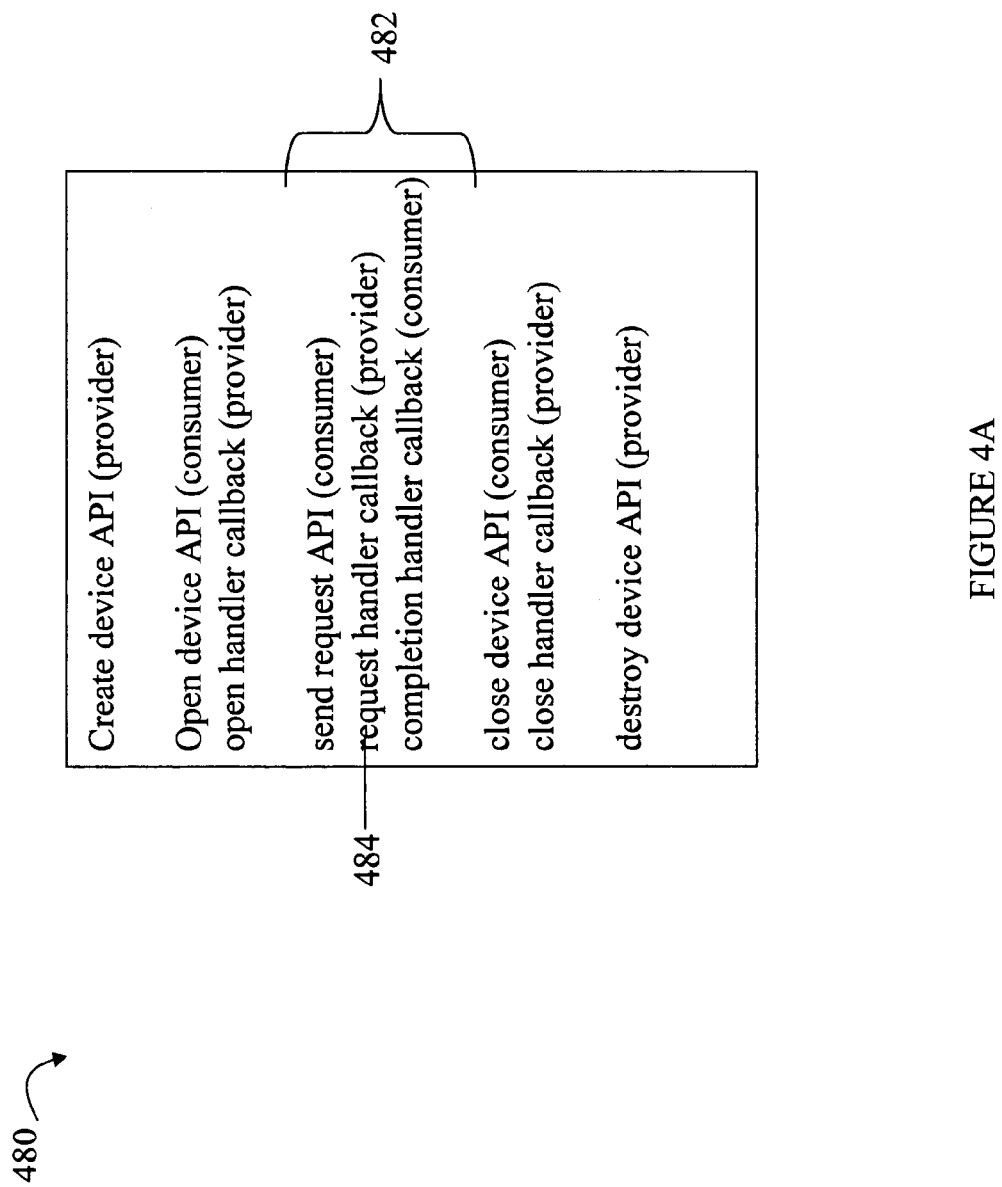

Referring to FIG. 4A, shown is an example 480 summarizing a typical logical processing order of API invocations and callbacks that may be executed in an embodiment in accordance with the techniques herein. The example 480 generally summarizes the flow described above, such as in connection with FIG. 4, and also includes placement of the completion handler callback. The following order or process flow is illustrated in the example 480:

Create device API (provider)
Open device API (consumer)
open handler callback (provider)
send request API (consumer)
request handler callback (provider)
completion handler callback (consumer)
close device API (consumer)
close handler callback (provider)
destroy device API (provider).

It should be noted that processing associated with 482 may be performed for each request sent from the consumer to the provider. The request handler callback 484 of the provider may also be a consumer and may perform processing to send requests to one or more logical devices. As such, the logical device runtime call chain or stack for multiple consumer-provider relationships as described herein may be created through the subsequent request API invocations.

Figure 5:
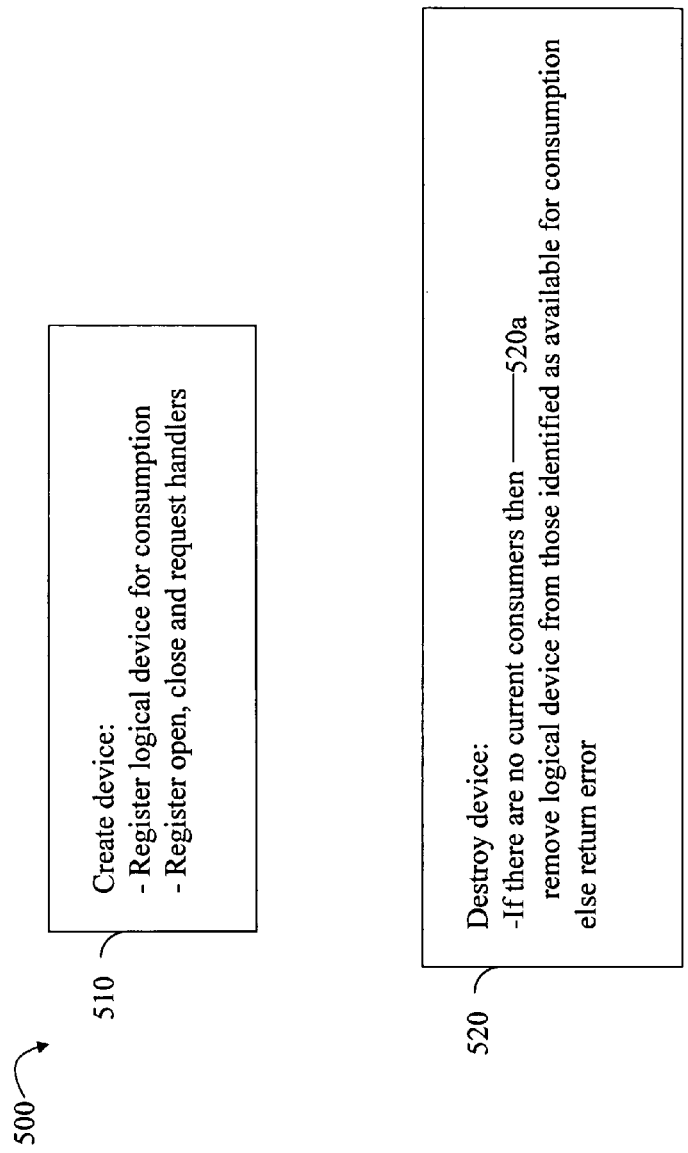
FIGS. 5 and 6 are more detailed examples of logical processing that may be performed in connection with the API of FIG. 3.

Referring to FIG. 5, shown is an example representing logical processing that may be performed by code of the API for the provider API routines. Element 510 describes processing steps that may be performed in connection with the create device routine which creates a logical device. As described above, the code of 510 may register for consumption (e.g. use by other code modules via the consumer API calls) a logical device as specified in the input parameters of the call. In one embodiment, the foregoing may include associating the logical device created with the provider container that performed the create device API call. The code of the create device API 510 also registers the specified open, close and request handlers to be invoked when the appropriate corresponding consumer API call is performed.

Element 520 describes processing steps that may be performed in connection with the destroy device routine which destroys or unregisters a logical device. The code of 520 may first make a determination in 520a as to whether there are any current consumers of the logical device specified in the input parameter. If not, then the logical device may be unregistered so that it is not available for consumption (e.g., the logical device may be removed from the provider container's name space of consumable logical devices). If there are currently consumers of this logical device, then the logical device cannot be destroyed and an appropriate error code may be returned. It should be noted that an embodiment may determine whether there are currently any consumers of the logical device in a variety of different ways. In one embodiment, as will be described in more detail in connection with consumer API coding logic, the API, as well as handlers of a provider code module as specified in the create device provider API call, may track which consumers are currently using a particular logical device via the open device and close device consumer APIs.

Figure 6:
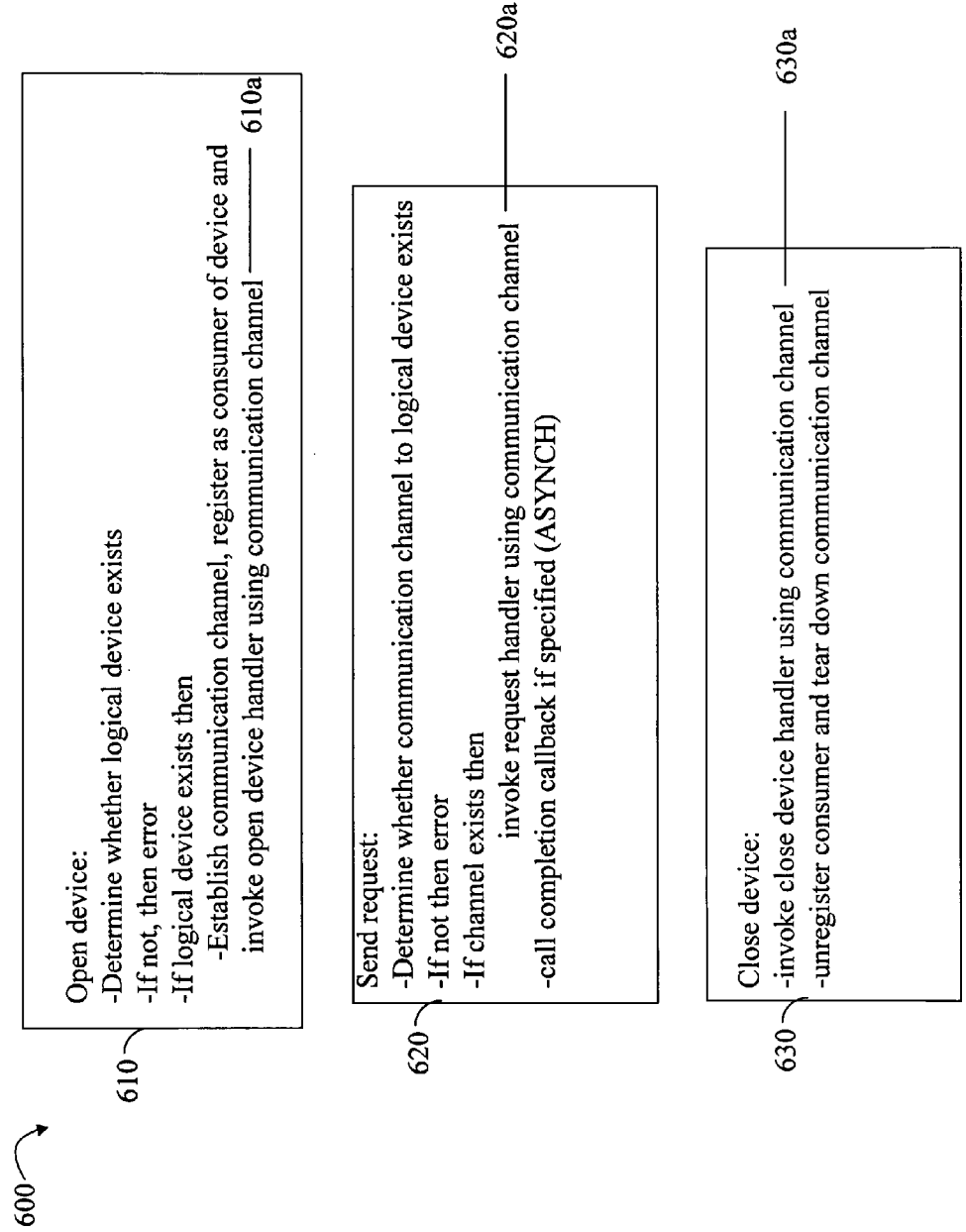

Referring to FIG. 6, shown is an example representing logical processing that may be performed by code of the API for the consumer API routines. Element 610 describes processing steps that may be performed in connection with the open device routine when a consumer opens a logical device. As illustrated in 610, the API code determines whether the logical device specified in the input parameters exists. If not, then an error status is returned. If the logical device exists, then the API code may establish a communication channel or path between the provider and consumer. Additionally, the consumer may be noted as a current consumer for the logical device. The API code may track consumers of a logical device. In one embodiment, a code module may be considered a consumer of the logical device if the code module has executed an open device API call until the close device API routine is called which removes the code module from the list of current consumers for the logical device. At 610*a*, the open device handler may then be invoked. In connection with performing step 610*a*, the API code may utilize the appropriate intermodule communication technique as described above in accordance with whether the consumer and provider are each executing in user mode or kernel mode to cause execution of the provider's open device handler.

In one embodiment, code of the API of a provider may generate the consumer ids as described elsewhere herein. Additionally, a code portion included in the API of a provider container may receive control via notification from other components (for example, such as those implementing the inter-module communications techniques described herein for cross-container communication) when a consumer container terminates, or in response to processing performed by the consumer container to invoke the open device handler in 610*a*, invoke the request handler in 620*a* (described below) or invoke the close device handler in 630*a* (described below). This code portion in the provider API may perform processing to track, for each consumer id, what one or more logical devices are currently opened. Additionally, this code portion of the API of a provider may track which consumer ids are associated with a particular consumer container performing open device consumer API calls so that, upon termination of the particular consumer container, this code portion of the provider may perform any processing needed for cleanup for those logical devices remaining open at the time the consumer container terminates. The code portion of the provider API may be notified in response to a consumer executing step 610*a* and the code portion may track which consumer id has performed the open device API call. The code portion of the provider API may also be provided with information identifying the container id for the consumer container performing the open device API call. Thus, for each logical device opened, the code portion of the provider API may track and associate each consumer id with a consumer container id, and for each consumer id, which logical devices are open at a point in time. The code portion of the provider API may be notified in response to a consumer executing step 630*a* and the code portion may remove the logical device being closed from the list of currently open logical devices for the consumer id. The code portion of the provider API may be notified in response to a consumer container being terminated and the code portion may then perform processing using the foregoing information to invoke the close device handler callback for each logical device which is open at the time the consumer container was terminated.

It should be noted that an embodiment may assign a unique consumer id at each invocation of the open device consumer API. As such, a single code module within a container may issue multiple open device consumer API calls to the same logical device and each invocation may be assigned a different consumer id. As described elsewhere herein, the code portion in a code module of a provider (container providing the logical device) may keep track of which container is associated with which one or more consumer ids so that if a container terminates, the close handler callback may be invoked to perform cleanup and other processing as needed on behalf of the container for all such consumer ids associated with the container that terminated. As described herein, the close handler callback may be specified in connection with create device of the provider API when creating the logical device being opened with the consumer API open device call. Thus, the concept of a consumer may be associated with each invocation of the open device API call so that, for example, a container may be characterized as a consumer, and a code module or other code entity associated with the container may also be characterized as a consumer. Furthermore, a single container and/or single code module within a container may be associated with multiple consumer ids for multiple corresponding open device API calls where each consumer id is associated with a different open device API call that can be for the same device.

Element 620 describes processing steps that may be performed in connection with a send request routine when a consumer sends a request to the logical device. A determination may be made as to whether a communication channel as identified by the input parameters exist between the consumer and provider for the logical device. The communication channel may be established by successful completion of a previous open device provider API call. If no such communication channel exists, the API may return an error as a status. If the communication channel exists, then the API may invoke the request handler callback at 620*a* using the communication channel for inter or cross container communication as needed. As described in connection with 610*a*, in step 620*a* the API code may utilize the appropriate intermodule communication technique as described in above in accordance with whether the consumer and provider are each executing in user mode or kernel mode to cause execution of the provider's open device handler. Subsequently, the completion callback may be invoked if this is an asynchronous send request invocation. As described elsewhere herein, if the completion callback is specified in the send request consumer API invocation, then this invocation is handled as an asynchronous invocation. Otherwise, the send request consumer API invocation is handled as a synchronous invocation. Rather than specify the completion callback on the send request consumer API call, the completion callback may be designated prior to the send request consumer API call using a separate API call.

In connection with performing step 620*a*, the API code may utilize the appropriate intermodule communication technique as described in above in accordance with whether the consumer and provider are each executing in user mode or kernel mode in order to send the request data to the provider for processing. As described elsewhere herein, the request handler may receive the consumer id as an input parameter which is used in tracking outstanding requests for the consumer so identified by the consumer id. Upon abnormal termination by the consumer, the close device handler described below may perform processing, such as any cleanup including deallocation and the like, for the outstanding requests.

Element 630 describes processing steps that may be performed in connection with the close device routine when a logical device is closed for a particular consumer. As illustrated in 630, the close device API routine may invoke the close device handler in 630*a* using the communication channel as may exist for consumer-provider intermodule communication. The close device logical processing of 630 may then unregister the consumer for the logical device and tear down the communication channel that may be used in connection with intermodule communication. In connection with performing step 630*a*, the API code may utilize the appropriate intermodule communication technique as described in above in accordance with whether the consumer and provider are each executing in user mode or kernel mode.

It should be noted that the techniques herein may also be used in connection with a consumer and provider which are included in the same container and an embodiment may use techniques other than the intermodule communication technique as described in the '759 and '822 application.

In an embodiment using the communication techniques as described in the '759 and '822 applications and the consumer terminates abnormally (which may occur when the consumer executes in user space), the provider (which may execute in user or kernel space) may be notified. Upon consumer failure (e.g., failure of a container including code which consumes a logical device), control may be returned to code of the provider API which then calls the close device handler as just described in 630. The close device handler may be invoked for each logical device that the failed container has left opened at the time of failure. The code of the provider API may be provided with suitable information so that the failing container can be identified. As described elsewhere herein, code of the provider API may track which consumer ids are associated with a particular container since termination may occur on a per container basis. Thus, upon termination of a container, the close device handler may be invoked for each logical device opened as determined in accordance with all consumer ids associated with that terminated container.

It should also be noted that use of the techniques described herein and the intermodule communication techniques as described in the '759 and '822 applications also provide for notification to the consumer regarding abnormal provider termination via an error return status in response to the different consumer API calls such as send request API call. The foregoing occurs if the consumer executes in user or kernel space and the provider, which executes in user space, terminates abnormally.

Figure 7:
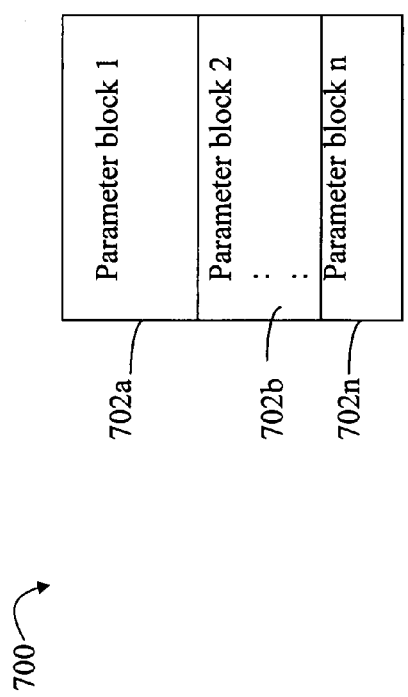
FIGS. 7 and 8 are examples illustrating storage associated with one or more requests that may be used in an embodiment with the techniques herein.

Referring to FIG. 7, shown is an example illustrating a data structure that may be used in connection with the techniques herein. The data structure of 700 may be allocated by a consumer, for example, which may provide a first set of parameters in area 702a. The structure 700 may include n parameter block portions in which each portion may correspond to a request that is used by a consumer making a call in the logical device runtime call chain or stack to a provider. Each of the n parameter blocks 702a-702n may include data for a single request in the call chain. The data of each parameter block may include input and output parameter information, metadata, and the like, with respect to a single request. For example with reference to FIG. 4, module 440 may allocate a structure 700 that includes n parameter blocks for each of n possible requests that may be issued in the call chain. Assume in this example that logical devices Y and A are not further consumers of any other logical device. A illustrated in FIG. 4, assume that X is a consumer of logical device Y and that logical device X is also a consumer of logical device A. In this case, the logical device runtime call chain may be represented as: X-Y and X-A for each request sent from 440 to logical device X. As such, code module 440 may allocate a structure for 3 parameter blocks—one parameter block for each request in the resulting call chain of logical device consumers-providers originating from module 440 for each request sent to the logical device X. In connection with the request sent to logical device X at invocation point 444, code module 440 may fill in parameter block 1 and issue the call at 444 to send the request to logical device X for processing. The xrequest routine 416 of the provider 402 of logical device X may then fill in parameter block 2 with information for a second request and issue the call at 416a. The xrequest routine 416 may then fill in parameter block 3 with information for a third request and issue the call 416b. Thus, an initial block of storage for one or more requests may be allocated at a time and then the storage may be accordingly used by other providers and consumers in the call chain. As just described, consumer 1 (e.g., module 440) may be the initial consumer or starting point in the chain that completes parameter block 1 and calls provider 1 (e.g., of logical device X). Provider 1, in turn, may also be a consumer of services of another provider 2 (e.g., for logical device Y) and provider 1 may use another parameter block in connection with the request sent to provider 2. Furthermore in connection with this example, provider 1 (e.g., of logical device X) may also be a consumer of services of another provider 3 (e.g., for logical device A) and may use the $3^{rd}$ parameter block in connection with the request sent to provider 3. It should also be noted that, as a variation to the example illustrated in FIG. 4, X may be a consumer of logical device Y and logical device Y may be a consumer of logical device A so that the call chain may be represented as X-Y-A and the same portion of memory including the 3 parameter blocks as just described may also be used in connection with the chain X-Y-A.

Figure 8:
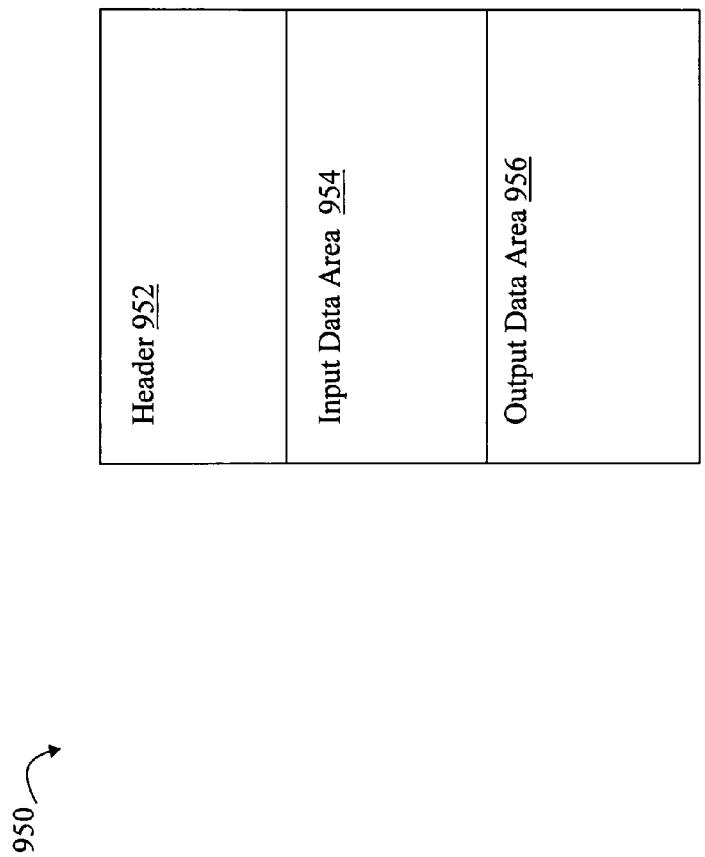

Referring to FIG. 8, shown is an example illustrating fields that may be included in a single parameter block for a request. The example 950 illustrates the different fields that may be included for a single request. The example 950 includes a header portion 952, an input data area 954 and an output data area 956. The header portion 952 may include parameters sent to the consumer to the provider (e.g., value for the logical device name). The header may also include other metadata about the command. For example, the header may include a request type indicator indicating one of a predefined number of request types such as read, write, and the like. The structure of the input data area 954 and output data area 956, as well as when the areas 954 and 956 are used may vary with the request type. An embodiment may also include as a request type a value indicating a non-standard request. A non-standard request may be used, for example, if a provider wishes to customize the format and usage of the remaining areas 954 and 956 of the request. The input data area and the output data area may have a data layout and structure as understood by the consumer and provider and used by the callback routines that may invoked. The foregoing provides for flexibility in connection with processing that may vary with each embodiment.

The header portion 952 may include request metadata, such as the request type described above. The input data area 954 may include the input data as well as metadata describing the input data. Such input metadata included in the input data area 954 may indicate how the input data is structured in the input data area as well as attributes about the input data included therein. Similarly, the output data area 956 may include the output data as well as metadata describing the output data. Such output metadata included in the output data area 956 may indicate how the output data is structured in 956 as well as attributes about the output data included therein.

With a non-standard request, two additional callbacks may be used in connection with sending request data across container boundaries as may be needed when the provider and consumer are both executing in the context of different containers (e.g., intermodule or container communications needed for U-U, U-K or K-U communications between provider and consumer). Code included in the API may only including processing for transmitting request data having a format in accordance with a known or predefined request type. Thus, if a non-standard request format is specified, an embodiment may include an additional first callback on the consumer side which is invoked by the API prior to sending a request. The additional first callback may marshal the request data by placing it in a format for transmission. A second additional callback may be included on the provider side which is invoked once the request data has been transmitted to the provider and prior to the provider commencing processing of the request data. The second additional callback may unmarshal or unpack the data and place it in a format as expected for use by the provider. The forgoing process may be reversed in connection with returning from the provider to the consumer using the same or different callbacks.

Figure 9:
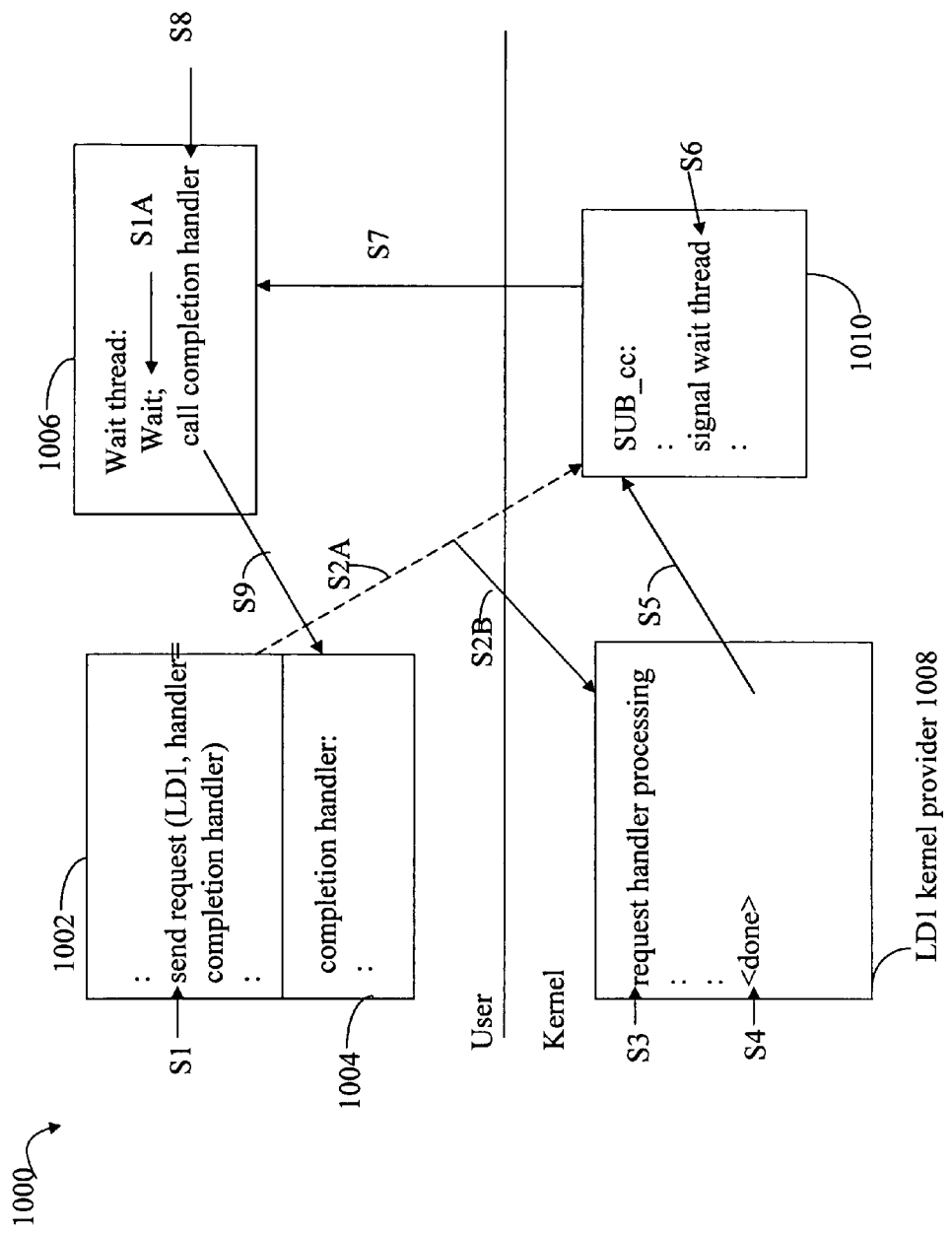
FIG. 9 is an example illustrating an asynchronous send request API call for a user space consumer and a kernel space provider in an embodiment using the techniques herein.

As described herein, the send request API call may be performed asynchronously. What will now be described with reference to FIG. 9 is one way in which this may be implemented in an embodiment in connection with a consumer in user space and the provider is in kernel space. The example 1000 includes a consumer code module 1002 executing as a single U-space container. At S1, an asynchronous send request consumer API call is performed in which the consumer completion handler 1004 is specified. As a result of executing code associated with the API invocation of S1, wait thread 1006 may be executed which waits to be signaled at step S1A. Context information regarding the completion handler 1004 is saved so that this handler can be invoked at a later point in execution described below. A substitute or alternate completion handler, SUB_cc, in the kernel mode code module 1010 is registered S2A so that it will be invoked as a first completion handler once the request handler code of the kernel provider 1008 has completed. Such a completion handler in kernel mode is needed since, upon completing execution of the kernel request handler code, a user space completion handler may not be directly invoked. Rather, alternate techniques illustrated and described below will result in indirectly invoking the real completion handler 1004. Control is then transferred S2B to the kernel module 1008 at point S3 where the request handler code therein is executed. After the request handler of the provider has completed execution at point S4, SUB_cc (the alternate but currently registered kernel completion handler) is invoked S5. At point S6, SUB-CC throws an event or otherwise signals S7 the wait thread 1006 to resume execution following point S1A. The wait thread 1006 resumes execution at S8 and calls the real completion handler 1004.

In connection with an asynchronous invocation at S1, execution of code in 1002 continues while the processing described above is performed. At some later point in time, the wait thread 1006 invokes the real completion handler 1004 as described. If the invocation at S1 to send a request is synchronous, execution of 1002 would pause and wait at point S1 until code of the send request API has completed processing and returns.

In the foregoing, particular examples and references may be made to a particular embodiment in which the techniques of the '759 and '822 patent applications may be used for intermodule communications. However, it will be appreciated that this, as well as other particulars described herein are for exemplary purposes only. An embodiment may use other suitable techniques for facilitating communications between consumers and providers than as described herein.

The techniques described herein may be used to provide a logical device model which has a logical device runtime stack or call chain in which each element of the stack or chain is a provider or consumer that can execute in the context of a different address space or container and can execute in user mode or kernel mode. The relationships between providers and consumers of logical devices may be characterized in accordance with the foregoing (e.g., by whether each of the provider and consumer execute in user mode or kernel mode, and in the context of the same or different address space or container). An embodiment using the techniques herein may provide for notification in a controlled and deterministic manner to a provider (executing in user or kernel space) when a user-space consumer abnormally terminates. An embodiment may also provide for notification in a controlled and deterministic manner to a consumer (executing in user space or kernel space) when a provider executing in user space abnormally terminates. The foregoing provides for a flexible logical device model allowing logical devices in one container to be visible or exposed to another container where consumer-provider relationships can be established with respect to a logical device in another container. Using the API herein provides for code portability so that operations performed in connection with the foregoing logical device model using the API may be converted using the API into actions performed using primitives native to the consumer and provider.

It should be noted that cleanup processing as described herein may be performed by different code portions. As described herein, code of the provider API may perform processing upon termination of a consumer container to invoke the close device handler or callback for each logical device the terminating consumer container has opened. The code of the provider API may use the consumer id and perform tracking as described herein for each logical device opened on a per container basis. It should also be noted that upon termination of a consumer container, other code portions, such as the close device handler of the provider API and also code portions of components implementing the intermodule communications techniques for cross container communications as described in the '759 and '822 patent applications may also perform any needed cleanup processing. Similarly, upon termination of a provider container, different forms of cleanup processing may be performed by different code portions.

Figure 10:
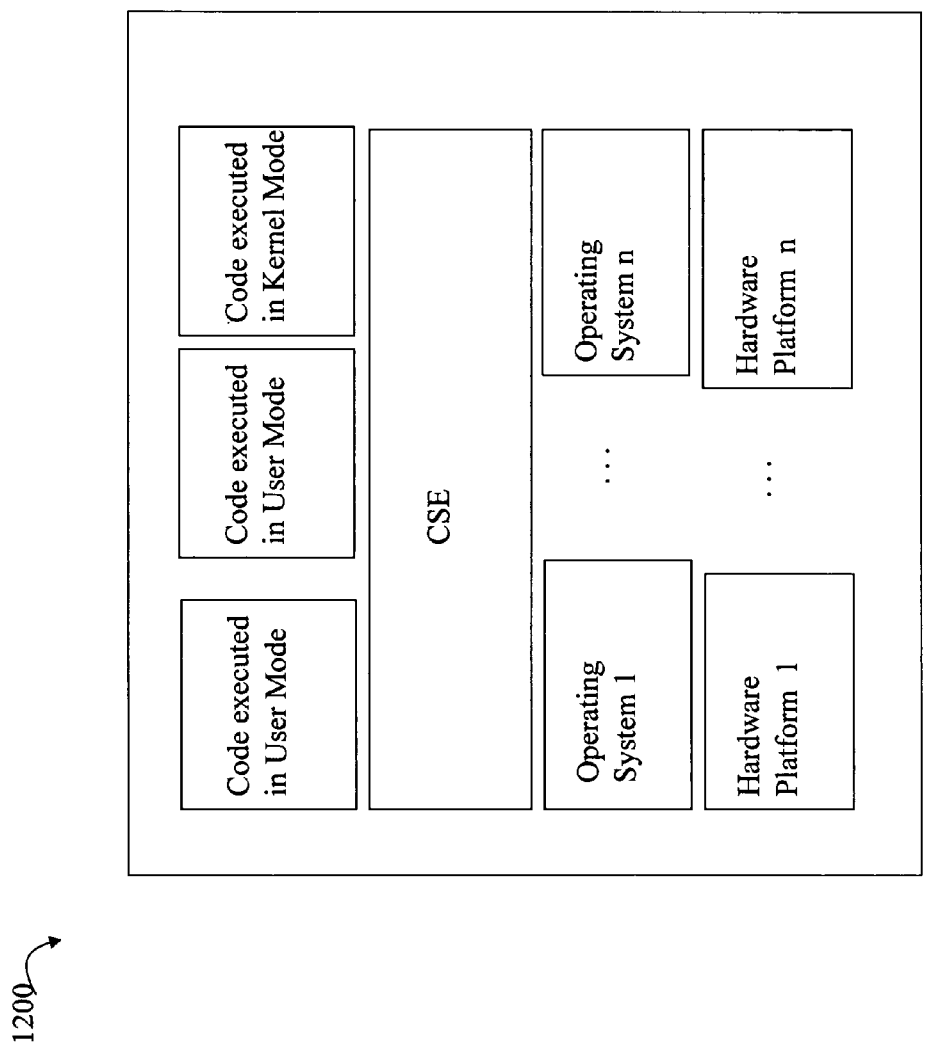
FIG. 10 is an illustration of the different operating systems and hardware platforms that may be included on a data storage system for use with the techniques herein.

Referring now to FIG. 10, shown is a representation illustrating the relationship of the common software environment (CSE) components to other components of the data storage system. In the example 1200, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code written using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Although the techniques herein are illustrated in an exemplary embodiment of a data storage system, the techniques herein may be used in connection with code executing on any computer processor on any system.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing a logical device model comprising:
providing a plurality of logical devices, at least one of said plurality of logical devices being a kernel mode logical device provided by a first provider executing in kernel space and at least one of said plurality of logical devices being a user mode logical device provided by a second provider executing in user space; and
establishing a relationship between the first provider and the second provider wherein the first provider is a consumer of a logical device provided by the second provider, said logical device model including said relationship, wherein the first provider, as a consumer of the logical device provided by the second provider, sends requests, which are directed to the logical device provided by the second provider, to code of an application programming interface that transfers runtime control to the second provider to execute code of the second provider in connection with processing the requests, wherein the logical device model comprises a logical device runtime stack representing a runtime call chain including the kernel mode logical device, the user mode logical device and a second user mode logical device provided by a third provider executing in user space, wherein the runtime call chain includes a plurality of runtime calls each transferring runtime control from code of a logical device consumer to code of a logical device provider, whereby the kernel mode logical device is a consumer of the user mode logical device and the user mode logical device is further a consumer of the second user mode logical device, wherein the second provider, that provides the user mode logical device as a consumer of the second user mode logical device provided by the third provider, sends other requests, which are directed to the second user mode logical device provided by the third provider, to code of the application programming interface that transfers runtime control to the third provider to execute code of the third provider in connection with processing the other requests.

2. The method of claim 1, wherein said first provider and said second provider use a same provider application programming interface in connection with logical devices provided by said first and said second providers for consumption by a consumer.

3. The method of claim 2, wherein the same provider application programming interface includes a first routine to create a logical device and make the logical device available for consumption, and a second routine to destroy the logical device so that the logical device is not available for consumption.

4. The method of claim 1, wherein each of said plurality of logical devices is associated with at least one of a service or a physical resource.

5. The method of claim 1, wherein a first logical device of said plurality of logical devices is a consumer of a plurality of others of said plurality of logical devices.

6. The method of claim 5, wherein the provider of the first logical device executes in user mode and said plurality of others of said logical devices are provided by a corresponding provider executing in kernel mode.

7. The method of claim 1, wherein a plurality of relationships are established between a plurality of consumers of said logical devices and a plurality of providers providing said logical devices, wherein each of said plurality of providers executing in user mode has a unique logical device name space, and wherein a single logical device name space is associated with all logical devices provided by all code modules executing in kernel mode.

8. The method of claim 7, wherein each of said plurality of providers is notified upon abnormal termination of a consumer executing in user mode that consumes a logical device provided by said each provider.

9. The method of claim 8, wherein each of said plurality of consumers is notified upon abnormal termination of a provider executing in user mode that provides a logical device which said each consumer consumes.

10. The method of claim 1, wherein said relationship represents a runtime relationship between said first provider and said second provider.

11. The method of claim 1, wherein said first provider performs a first call to code of the application programming interface using a defined interface to create the kernel mode logical device, said first call including a plurality of parameters, each of said plurality of parameters specifying a callback routine that is a handler included in code of the first provider and that is invoked by code of the application programming interface in response to an invocation made by a consumer of the kernel mode logical device, wherein said second provider performs a second call to code of the application programming interface using the defined interface to create the user mode logical device, said second call including a plurality of parameters, each of said plurality of parameters specifying a callback routine that is a handler included in code of the second provider and that is invoked by code of the application programming interface in response to an invocation made by a consumer of the user mode logical device.

12. A non-transitory computer readable medium comprising executable code stored thereon that, when executed, performs a method for providing a logical device model comprising:
  providing a plurality of logical devices, at least one of said plurality of logical devices being a kernel mode logical device provided by a first provider executing in kernel space and at least one of said plurality of logical devices being a user mode logical device provided by a second provider executing in user space; and
  establishing a relationship between the first provider and the second provider wherein the first provider is a consumer of a logical device provided by the second provider, said logical device model including said relationship, wherein the first provider, as a consumer of the logical device provided by the second provider, sends requests, which are directed to the logical device provided by the second provider, to code of an application programming interface that transfers runtime control to the second provider to execute code of the second provider in connection with processing the requests, wherein the logical device model comprises a logical device runtime stack representing a runtime call chain including the kernel mode logical device, the user mode logical device and a second user mode logical device provided by a third provider executing in user space, wherein the runtime call chain includes a plurality of runtime calls each transferring runtime control from code of a logical device consumer to code of a logical device provider, whereby the kernel mode logical device is a consumer of the user mode logical device and the user mode logical device is further a consumer of the second user mode logical device, wherein the second provider, that provides the user mode logical device as a consumer of the second user mode logical device provided by the third provider, sends other requests, which are directed to the second user mode logical device provided by the third provider, to code of the application programming interface that transfers runtime control to the third provider to execute code of the third provider in connection with processing the other requests.

13. The non-transitory computer readable medium of claim 12, wherein said first provider and said second provider use a same provider application programming interface in connection with logical devices provided by said first and said second providers for consumption by a consumer, and wherein the same provider application programming interface includes a first routine to create a logical device and make the logical device available for consumption, and a second routine to destroy the logical device so that the logical device is not available for consumption.

14. The non-transitory computer readable medium of claim 12, wherein each of said plurality of logical devices is associated, with at least one of a service or a physical resource, a first logical device of said plurality of logical devices is a consumer of a plurality of others of said plurality of logical devices, and wherein the provider of the first logical device executes in user mode and said plurality of others of said logical devices are provided by a corresponding provider executing in kernel mode.

15. The non-transitory computer readable medium of claim 12, wherein a plurality of relationships are established between a plurality of consumers of said logical devices and a plurality of providers providing said logical devices, wherein each of said plurality of providers executing in user mode has a unique logical device name space, and wherein a single logical device name space is associated with all logical devices provided by all code modules executing in kernel mode, and wherein each of said plurality of providers is notified upon abnormal termination of a consumer executing in user mode that consumes a logical device provided by said each provider, and each of said plurality of consumers is notified upon abnormal termination of a provider executing in user mode that provides a logical device which said each consumer consumes.

16. The non-transitory computer readable medium of claim 12, wherein said first provider performs a first call to code of the application programming interface using a defined interface to create the kernel mode logical device, said first call including a plurality of parameters, each of said plurality of parameters specifying a callback routine that is included in code of the first provider and that is invoked by code of the application programming interface in response to an invocation made by a consumer of the kernel mode logical device, wherein said second provider performs a second call to code of the application programming interface using the defined interface to create the user mode logical device, said second call including a plurality of parameters, each of said plurality of parameters specifying a callback routine that is included in code of the second provider and that is invoked by code of the application programming interface in response to an invocation made by a consumer of the user mode logical device.

17. A system comprising:
  a hardware processor; and
  a memory, comprising code stored therein that, when executed by the processor, performs a method comprising:
    providing a plurality of logical devices, at least one of said plurality of logical devices being a kernel mode logical device provided by a first provider executing in kernel space and at least one of said plurality of logical devices being a user mode logical device provided by a second provider executing in user space; and
    establishing a relationship between the first provider and the second provider wherein the first provider is a consumer of a logical device provided by the second provider, said logical device model including said relationship, wherein the first provider, as a consumer of the logical device provided by the second provider, sends requests, which are directed to the logical device provided by the second provider, to code of an application programming interface that transfers runtime control to the second provider to execute code of the second provider in connection with processing the requests, wherein the logical device model comprises a logical device runtime stack representing a runtime call chain including the kernel mode logical device, the user mode logical device and a second user mode logical device provided by a third provider executing in user space, wherein the runtime call chain includes a plurality of runtime calls each transferring runtime control from code of a logical device consumer to code of a logical device provider, whereby the kernel mode logical device is a consumer of the user mode logical device and the user mode logical device is further a consumer of the second user mode logical device, wherein the second provider, that provides the user mode logical device as a consumer of the second user mode logical device provided by the third provider, sends other requests, which are directed to the second user mode logical device provided by the third provider, to code of the application programming interface that transfers runtime control to the third provider to execute code of the third provider in connection with processing the other requests.

\* \* \* \* \*